（12） United States Patent
Noe

(10) Patent No.: US 6,462,635 B1
(45) Date of Patent: Oct. 8, 2002

(54) RESONANT DEVICE, SUCH AS A STRIKER OR LOAD GENERATOR

(75) Inventor: Mathieu Noe, Barbizon (FR)

(73) Assignee: Vibrachoc, Evry (FR)

( * ) Notice: Subject to any disclaimer, the term of this patent is extended or adjusted under 35 U.S.C. 154(b) by 0 days.

(21) Appl. No.: 09/560,044

(22) Filed: Apr. 27, 2000

(30) Foreign Application Priority Data

Apr. 22, 1999 (FR) .............................................. 99 05110

(51) Int. Cl.[7] .................................................. H01F 7/08
(52) U.S. Cl. ...................................... 335/271; 335/279
(58) Field of Search ................................ 335/261–263, 335/279–81, 249, 220, 222, 229, 271–3, 277; 310/15–18

(56) References Cited

U.S. PATENT DOCUMENTS

| 3,909,148 | | 9/1975 | Vural et al. | |
|---|---|---|---|---|
| 5,144,176 | * | 9/1992 | Popper | 310/81 |
| 5,352,101 | * | 10/1994 | Morinigo et al. | 417/410.1 |
| 5,565,665 | * | 10/1996 | Biglari et al. | 181/122 |

FOREIGN PATENT DOCUMENTS

| DE | 23 02 098 A | | 7/1974 |
|---|---|---|---|
| EP | 0 676 559 A | | 10/1995 |
| JP | 57 186651 | | 11/1982 |
| JP | 1-120453 | * | 5/1989 |

* cited by examiner

Primary Examiner—Lincoln Donovan
(74) Attorney, Agent, or Firm—Alston & Bird LLP

(57) ABSTRACT

The invention relates to a resonant device comprising a mass/spring system composed of a main mass comprising at least one main mass element, and of at least one spring element (3). The device is one which comprises at least one additional mass (10) comprising at least one additional mass element (102) and a coupling device (204) able to couple the additional mass (10) to the main mass (1) and to decouple it therefrom, so as to modify the tuning frequency of the device.

14 Claims, 3 Drawing Sheets

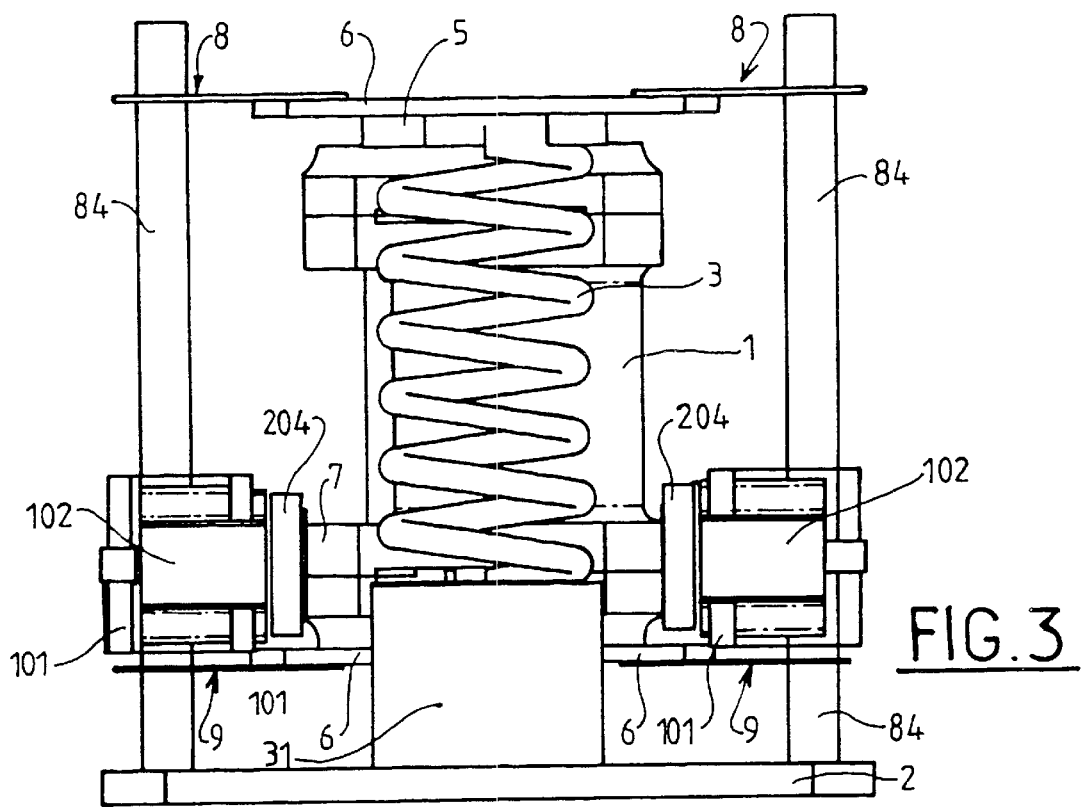
FIG.3
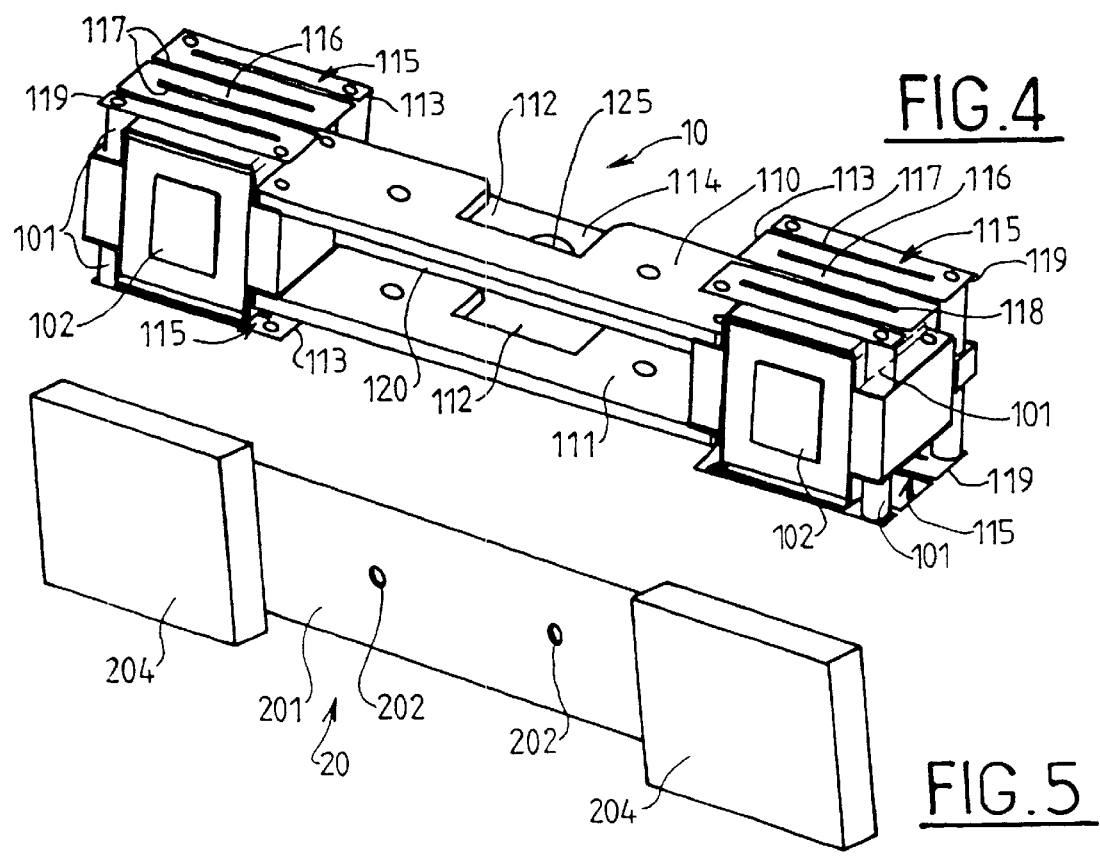
FIG.4
FIG.5

RESONANT DEVICE, SUCH AS A STRIKER OR LOAD GENERATOR

The subject of the present invention is a resonant device comprising a mass/spring system associating a main mass and a spring, usable as a passive or active striker turned in such a way as to stifle a vibration, or else as a generator of dynamic loads so as to apply loads to a structure.

Tuning is obtained by choosing the mass and the stiffness of the spring so that for example the natural frequency of the mass/spring assembly is equal to that of the vibration to be generated or to be stifled.

A match between the device and the vibration or vibrations to be stifled poses a certain number of problems. One of these problems is that, for the known devices, the tuning frequency is fixed, and that the device cannot therefore be used other than for operation at a given frequency.

According to a first aspect, the present invention aims to allow frequency adjustment of the device.

For this purpose, the invention relates to a passive or active resonant device comprising a mass/spring system composed of a main mass comprising at least one main mass element, and of at least one spring element, which device comprises at least one additional mass comprising at least one additional mass element and a coupling device able to couple the additional mass to the main mass and to decouple it therefrom, so as to modify the tuning frequency of the device.

The device can be one which comprises at least one electromagnetic assembly comprising two complementary devices of which the first exhibits at least one electromagnetic piece and of which the second exhibits at least one electromagnet, one of the two complementary devices being coupled to the main mass, and the other complementary device being coupled to an additional mass, the two devices being disposed facing one another, in such a way that, when one said electromagnet is activated, two said complementary devices are mechanically integral, so that the main mass and said additional mass are coupled.

At least one electromagnetic piece can be coupled for example elastically to the main mass, at least one electromagnet then being coupled to said additional mass. Said elastic coupling, which is for example produced with the aid of a flexible leaf, can exhibit an elastic degree of freedom in a direction substantially perpendicular to a main direction of the oscillations of the main mass, for example the direction of generation of loads.

The device can be one wherein a first complementary device comprises two electromagnetic pieces spaced apart from one another and integral with said flexible leaf, and wherein a second complementary device comprises two electromagnets disposed facing the two electromagnetic pieces. The two electromagnets may be integral with at least one linking piece.

At least one additional mass may be held in position by an elastic device which exhibits an elastic degree of freedom in a direction substantially parallel to a main direction of the oscillations of the main mass, this elastic device exhibiting for example at least one elastic leaf.

Another problem with the prior art devices is that, once a frequency has been chosen, it is difficult to control the amplitude of the oscillations of an active striker, also referred to as a generator of dynamic loads, which may, in the vicinity of resonance, become very large and lead to the saturation or even to the destruction of an actuator producing said dynamic loads.

Yet another problem with the prior art devices is that it is difficult to transmit sizable dynamic loads.

According to a second aspect, the present invention allows good control of the amplitude of the oscillations, and/or allows the transmission of sizable loads.

For this purpose, the invention proposes a generator of dynamic loads comprising a main mass/spring system composed of a main mass comprising at least one main mass element of mass m2 and of at least one spring element of stiffness K2, and which is such that it comprises an auxiliary mass/spring system which is coupled to the main mass/spring system and which is composed of an auxiliary mass of mass m3 and of at least one auxiliary spring element of stiffness K3, the assembly exhibiting a first and a second resonant frequency, denoted $f_0$ and $f_2$ respectively, and an anti-resonant frequency $f_1$, with $f_0<f_1<f_2$. The generator can in particular operate at the frequency $f_0$ and/or at the frequency $f_1$, for example with the aid of an excitation device for actuating the generator between the frequencies $f_0$ and $f_2$ and in particular at the anti-resonant frequency $f_1$.

In general, the generator can normally operate at any frequency. Its use is not limited to the frequencies $f_0$, $f_1$, $f_2$, but, the characteristic of anti-resonance at the frequency $f_1$ is not utilized.

The benefit of operation at the frequency $f_1$ (or in the vicinity thereof) is that it allows operation at reduced amplitude, so that it is practically impossible in saturate the actuator mechanically, whereas one still benefits from the mechanical amplification. The only limitation being the maximum intensity allowed by the generator, it is possible to generate sizable loads which may be transmitted to a structure.

Moreover, it is possible to vary the aforesaid frequencies and in particular the frequencies $f_0$ and $f_1$, by adding at least one additional mass which can be coupled to decoupled from the main mass, in accordance with the first aspect of the invention, according to the various embodiments mentioned hereinabove.

Other characteristics and advantages of the invention will become more apparent on reading the following description, given by way of nonlimiting example, in conjunction with the appended drawings in which:

FIG. 3 is a side view of the device according to FIG. 2;

FIG. 4 represents a preferred embodiment of an additional mass module;

FIG. 5 represents a device with ferromagnetic mass, usable to couple an additional mass;

Figure 1:
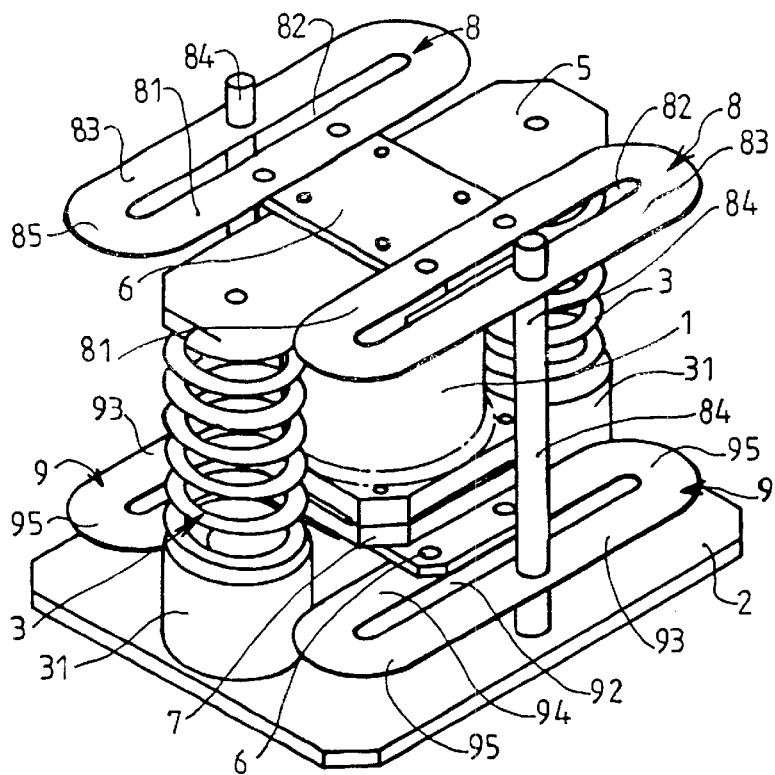
FIG. 1 represents a device comprising a mass/spring system usable within the framework of the present invention.

The device represented in FIG. 1 comprises a mass element 1 of mass m3 which, in the case of an active striker, incorporates an electrodynamic or variable-reluctance generator. A plate 5 fixed to the element 1 carries at its two ends springs 3 which impart a stiffness K3 to the mass/spring system as constructed. These two springs 3 rest on cylindrical lugs 31 carried by a platen 2 which is coupled to a structure whose vibrations one wishes to stifle or to which one wishes to communicate vibrations.

At the upper part, the plate 5 carries a platelet 6 to the ends of which are fixed the branches 81 of two springs 8 which exhibit two opposite branches 81 and 83 separated by a slot 82 and interlinked by the sectors 85. At the lower part, the element 1 exhibits a platen 7 at the lower part of which is mounted a plate 6 to the ends of which are fixed the branches 91 of two springs 9 similar to the springs 58 and which exhibit two opposite branches 91 and 93 separated by a slot 92 and linked by sectors 95. The branches 83 and 93 of the springs 8 and 9 are integral with uprights 84 perpendicular to the plane of the platen 2 and which are integral therewith. The plates 6 being integral with the plate 5 and the platen 7, the springs 8 and 9 make it possible to center the mass l/spring 3 assembly during its deflections perpendicular to the plane of the platen 2.

The uprights 84 can be used to dispose additional masses which can be coupled to the main mass 1 or else decoupled therefrom, so as to vary the dynamic mass of the striker, and hence to modify the conditions of resonance.

As shown by FIG. 4, an additional mass module 10 for adding a mass m4 to the main mass m3 comprises two electromagnets 102 mounted at the two ends of the linking arm 110 and 111, notched at 112 with a view to the passage of an upright 84. Springs 115 exhibiting arms 116 form a zigzag path, which are separated by slots 117 running from opposite ends 113 and 119. These springs 115 serve to suspend and guide the mass m4 which consists of the two electromagnets 102 and the linking pieces 110 and 111.

Each spring 115 is mounted on two pairs of ties 101 and 103. The ties 101 are integral with a fixed plate 120 integral via its aperture 125 with the upright 84. The ties 103, mounted opposite the ties 101, are integral with the corresponding electromagnet 102. For each electromagnet, there are two pairs, upper and lower, of ties 101, and two pairs, upper and lower, of ties 103. In this way one obtains a degree of freedom parallel to the direction of displacement of the element 1, that is to say perpendicular to the plane of the platen 2.

FIG. 5 shows the device 20 which makes it possible to couple the additional mass m4 (ref. 10) to the main mass 3. It comprises two ferromagnetic masses 204 for example laminated mounted at the end of a flexion leaf 201 fixed at the level of its apertures 202 onto a side face of the platen 7. This flexion leaf exhibits a high stiffness in the direction of displacement of the mass 1 of the striker, that is to say, of the vibration to be generated or to be attenuated, but a much lower stiffness in the plane perpendicular to said direction of displacement.

Figure 2:
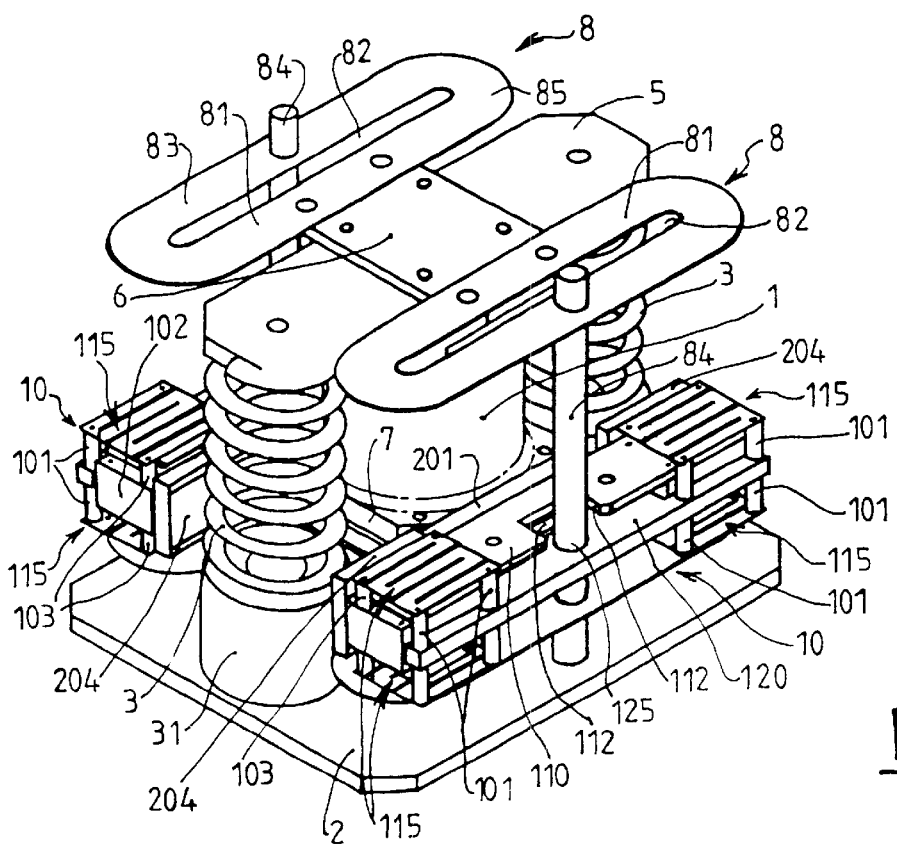
FIG. 2 represents a preferred embodiment relating to the first aspect of the invention, and which is also usable within the framework of the second aspect of the invention.

As shown by FIG. 2, the ferromagnetic masses 204 are situated facing the electromagnets 102. In this way, the magnetic circuits of the electromagnets 102 close up around the magnetic masses 204.

The coupling is performed as follows: the activation of the electromagnets 102 causes the application of the masses 204 to the surface of the electromagnets 102, and hence a mechanical coupling of the additional mass. Given that the platen 7 is integral in displacement with the main mass, the additional mass is also entrained in a movement parallel to the axis of the uprights 84, which is made possible by the suspension effect afforded by the strip springs 115.

When the electromagnets 102 are deactivated, the masses 204 part from the electromagnets 102, and the additional mass is decoupled from the main mass.

The embodiment of FIGS. 2 to 5 makes it possible to achieve a variation in the mass of the striker by coupling one or more additional masses of specific values, thus making it possible to change the frequency of the striker so as to deal with vibrations whose frequency may change.

In the example represented, the four electromagnets are excited simultaneously so as to couple the two modules 10 of the main element 1.

Thus, the desired number of masses can be added and the striker can be accorded as many new tuning frequencies.

The fixing of the additional masses makes it possible: on the one hand, when they are not coupled to the main mass, for them to remain facing the flexion leaf bound to the mass of the striker and to do so throughout the latter's travel, on the other hand, for it to follow the movement of the main mass in connected mode.

This result is obtained by virtue of the leaf springs 115 which are sufficiently stiff in the plane perpendicular to the direction of the movement of the striker as to avoid their movement in this plane and sufficiently flexible in the direction of the movement of the striker as to accompany it in its displacements, the flexibility being fixed in such a way as to achieve with the new mass and the antecedent characteristics of the striker the new tuning of the latter. The stiffness of these leaves can be supplemented by those of springs acting in parallel with them so as to achieve the new tuning, (this amounting, as it were, to connecting to the initial striker a new striker placed in parallel).

According to the second aspect of the invention, the device described makes it possible to generate sizable dynamic loads at low frequency according to a compound supplied to an electronic box.

The load is generated in an inertial manner, that is to say by using the principle of action/reaction as applied to a load-excited mass. The mass consists of the mass of the body of the generator.

The invention can be implemented with the aid of a variable-reluctance generator incorporated into the main mass 1 and of its control via a digital computer whose algorithm linearizes the force/displacement characteristic thereof in a manner known per se, both as a generator of load and of mass in a mass/spring system with a view to introducing sizable loads at low frequency into a structure.

When one seeks to generate a load on an arbitrary structure S without relying on another structure, the basic principle consists in relying on a reaction mass m2. The magnetic load 0 created between the structure and the mass m2 gives rise to a load Ft in the structure S. This load is related to 0 by the relation Ft=H,U where H is a transfer function given by the characteristics of the mounting of the generator:

$$H(p)=m2p^2/(m2p^2+K2)$$

p is the Laplace variable
K2 denoting the stiffness of the elastic link between the mass m2 and the structure S.

In general, the mass m2 is constituted by the movable mass of an electromagnetic generator (variable-reluctance generator) or of an electrodynamic generator.

The mass m2 and the elastic link of rigidity K2 constitutes an oscillating mechanical system whose amplification and resonance can be exploited within the limits of the allowable deflection.

This technique is commonly used with electrodynamic generators (coils steeped in a constant field).

Nevertheless, this technique which uses electrodynamic generators is difficult to implement when one seeks high levels of transmitted loads Ft (typically greater than 1 kN), since it would lead to a prohibitive mass and prohibitive bulk of the permanent magnets creating the magnetic field.

The direct use of variable-reluctance generators which supply sizable loads within a then reduced volume is scarcely possible at low frequency, since their travel is limited by the need to have small gaps to generate load.

The solution is obtained by exciting a mass/spring oscillating system at a frequency close to its natural frequency.

One then benefits from the amplification coefficient of such a system, without needing to generate a sizable initial load.

Figure 6:
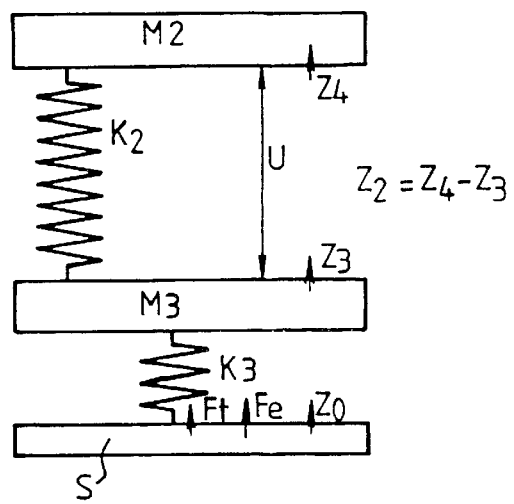
FIG. 6 illustrates a device according to the second aspect of the invention.

The mounting diagram (see FIG. 6) implements a generator having a suspended mass m2 with a stiffness K2, which excites the mass m3 of the auxiliary mass/spring system, having an auxiliary mass m3 and exhibiting a stiffness K3.

The mass m2 is constituted by the main mass 1 which is coupled to a generator whose movable mass it constitutes. The stiffness K2 is defined by the springs 3.

Figure 7:
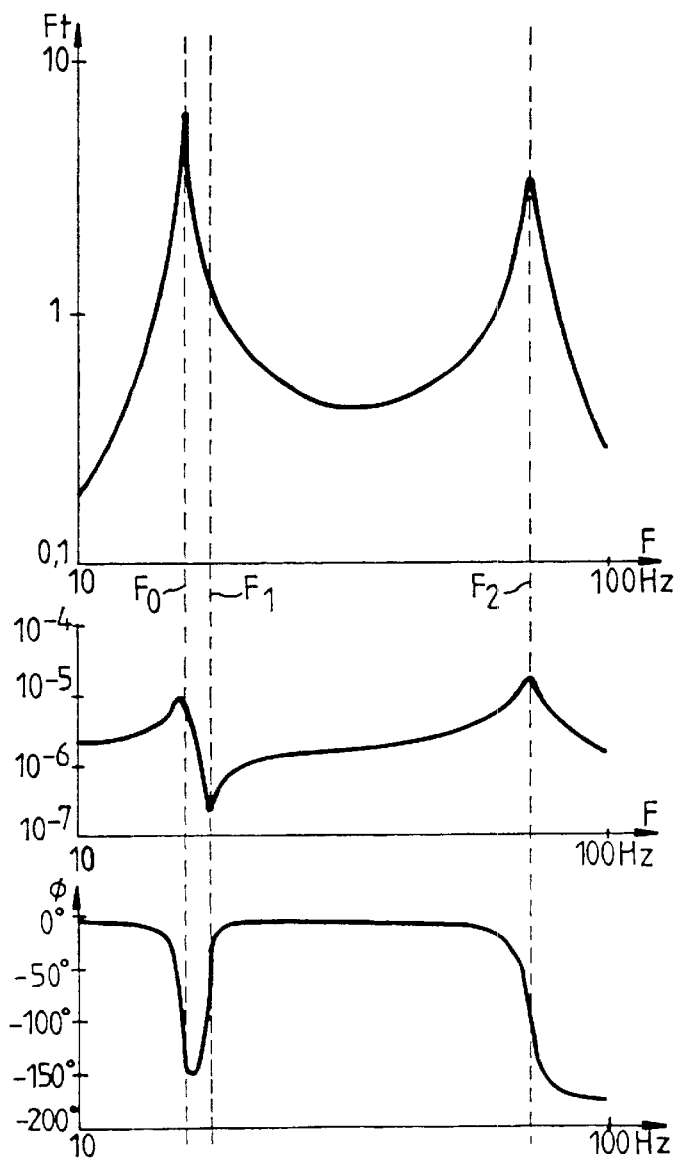
FIG. 7 represents the response curves of the second aspect of the invention.

Denoting by $Z_2$ the amplitude of the movement of the mass m2 with respect to the mass m3, we have:

$Z_3/U - [(m2+m3)p^2+K3)]/[m2.m3.p^4+(K2.m2+m2.K3+K2.m3)p^2+K2.K3]$, $Ft/0 - -K3.m2.p^2/[m2.m3.p^4+(K2.m2+m2.K3+K2.m3)p^2+K2.K3]$, thus making it possible to determine the three natural frequencies $f_0$, $F_1$ and $f_2$, which are related to the mass and stiffness parameters by the following formula:

$f_0 - \frac{1}{2}\pi(m2.K2+K2.m3+K2.m2 - \sqrt{\Delta})$ $f_1 - \frac{1}{2}\pi\sqrt{K3/(m2+m3}$ $f_2 = \frac{1}{4}\pi(m2.K3=K2.m3=K2.m2\cdot\sqrt{\Delta})$ $\Delta - (m2^Z.K3^2 - 2m2.m3.K2.K3 + 2m2^2.K3.K2 = K2^2.m3^2 - 2R2^2.m3.r2 + K2^2.m2^2)/(m2.m3)$ These formulae can be depicted via the graphical representations given in FIG. 7, with the following values:

$K3 - 2.2 \ 10^3 N/m$ $m3 - 4$ kg $K2 - 1.518 \ 10^6$ N/m $m3 = 13.7$ kg.

The top curve presents the modulus of the transfer function Ft/U, the middle curve presents the modulus of the transfer function $Z_2/U$, the bottom curve represents the phase of the transfer function $Z_2/U$.

The device exhibits two resonant frequencies $f_0$ and $f_2$ for which there if a large amplification of the load generated, and an antiresonant frequency $f_1$ corresponding to the natural mode of the masses m2+m3 on the spring K3.

Since one wishes to generate loads at low frequency, the masses and the stiffnesses can be adjusted in such a way that the resonant frequency $f_0$ or $f_1$ is the one used.

If the load generator is driven at the frequency $f_0$, it may be seen that the amplitude $z_2$ may become very large and lead to the saturation, or even the destruction of the actuator. On the other hand, it is noted that this amplitude becomes very low around the antiresonance $f_1$. In the case of a variable-reluctance generator, this amplitude $z_2$ is the variation in the gap, which implies that it is therefore possible to use a small gap and consequently obtain a sizable generated load.

If one drives at the frequency $f_1$, the fact that a small displacement $z_2$ is obtained leads to the use of the variable-reluctance actuator for the reason seen hereinabove. It is then almost impossible to saturate the actuator mechanically since $z_2$ remains very small regardless of U. The limitation of usage is no longer due to a resonance which is still difficult to control, but to the maximum intensity allowed by the generator.

At this frequency, the ratio Ft/U is always greater than 1, which implies that one again profits from the mechanical amplification.

It is therefore at the frequency $f_1$ that one must manage to generate the most sizable load Ft transmitted to the structure. Its value depends essentially on the maximum intensity of the current which one wishes to circulate around the coils of the variable-reluctance generator.

To guarantee that the 3 frequencies $f_0$, $f_1$, $f_2$ comply with the relation $f_2 > f_1 > f_0$, the masses and stiffnesses must be chosen such that:

$f_1$ is given as being the frequency of the sought-after maximum of Ft $f2 = k.f_1$ with $k > 1$, ideally $2 < k < 4$ m2 being given, $k2 \approx m2 \ (2\pi.f_2)^2$ (this value has been calculated in decoupled mode, thereby giving as a first approximation an overestimated result which can be corrected manually subsequently).

We then have $K3 = (m2+m3)(2\pi.f_2)^2$, m3 being a mass bound to the mechanical construction (casing of the actuator, 1/2 mass of K3 and K2 etc.). For a maximum load Ft with given total mass, it is beneficial to maximize m2 with respect to (m2+m3).

By complying with these relations, one will naturally have $f_0 < f_1$.

The generator is preferably of the variable-reluctance type with an auxiliary movable mass of value m2, the main mass being adjusted to the value m3.

Leaf springs having high flexibility in the direction of the sought-after vibrations, and stiff in the other directions, make it possible to guide the mass m2. It is for this purpose possible to use a mounting of the same type as for the additional mass m4.

It is noted however that another type of guidance could be used since any damping which it might introduce would be less troublesome than for a system working at the resonance of frequency $f_0$, given that at the anti-resonant frequency $f_1$, the amplification coefficient is hardly modified by any damping, whereas it is greatly so at resonance.

What is claimed is:

1. A resonant device comprising a mass/spring system comprising a main mass having a main direction of oscillation and comprising at least one main mass element, and at least one spring element, at least one additional mass comprising at least one additional mass element, wherein the at least one additional mass is held in position by an elastic device which exhibits an elastic degree of freedom in a direction substantially parallel to said main direction of oscillation of the main mass, and a coupling device releasably coupling the at least one additional mass to the main mass, so as to modify the tuning frequency of the device.

2. A resonant device as claimed in claim 1, wherein the coupling device comprises at least one electromagnetic assembly comprising two complementary devices of which the first comprises at least one magnetic mass and of which the second comprises at least one electromagnet, one of the two complementary devices being coupled to the main mass, and the other complementary device being coupled to said at least one additional mass, the two devices being disposed facing one another, in such a way that, when one said electromagnet is activated, two said complementary devices are mechanically engaged, so that the main mass and said at least one additional mass are coupled.

3. The resonant device as claimed in claim 2, wherein said at least one magnetic mass is coupled to the main mass and wherein said at least one electromagnet is coupled to said at least one additional mass.

4. The resonant device as claimed in claim 3, wherein the coupling between said magnetic mass and the main mass is elastic.

5. The resonant device as claimed in claim 4, wherein said coupling exhibits an elastic degree of freedom in a direction substantially perpendicular to said main direction of the oscillations of the main mass.

6. The resonant device as claimed in claim 4, wherein said elastic coupling is produced by at least one flexible leaf.

7. The resonant device as claimed in claim 6, wherein a first of said two complementary devices comprises two magnetic masses spaced apart from one another and integral with said flexible leaf, and wherein a second of said two complementary devices comprises two electromagnets disposed facing the two magnetic masses.

8. The resonant device as claimed in claim 7, wherein the two electromagnets are integral with at least one linking piece.

9. The resonant device as claimed in claim 1, wherein said elastic device comprises at least one elastic leaf.

10. A resonant device comprising
   a mass/spring system comprising a main mass having a main direction of oscillation and comprising at least one main mass element, and at least one spring element,
   at least one additional mass comprising at least one additional mass element, and
   at least one electromagnetic assembly releasably coupling the at least one additional mass to the main mass so as to modify the tuning frequency of the device by selectively coupling and decoupling said assembly,
   wherein each of said at least one electromagnetic assembly comprises a first complementary device comprising at least one magnetic mass coupled to said main mass and a second complementary device comprising at least one electromagnet coupled to said at least one additional mass, the at least one magnetic mass and at least one electromagnet being disposed facing one another in such a way that, when said at least one electromagnet is activated, said at least one magnetic mass is mechanically engaged, so that the main mass and said at least one additional mass are coupled,
   wherein the coupling between said magnetic mass and the main mass is produced by at least one flexible leaf.

11. The resonant device as claimed in claim 10, wherein said first complementary device comprises two magnetic masses spaced apart from one another and integral with said flexible leaf, and wherein said second complementary device comprises two electromagnets disposed facing the two magnetic masses.

12. The resonant device as claimed in claim 11, wherein the two electromagnets are integral with at least one linking piece.

13. The resonant device as claimed in claim 10, wherein said at least one additional mass is held in position by an elastic device which exhibits an elastic degree of freedom in a direction substantially parallel to a main direction of the oscillations of the main mass.

14. The resonant device as claimed in claim 13, wherein said elastic device comprises at least one elastic leaf.

* * * * *

UNITED STATES PATENT AND TRADEMARK OFFICE
CERTIFICATE OF CORRECTION

PATENT NO. : 6,462,635 B1
DATED : October 8, 2002
INVENTOR(S) : Noe

It is certified that error appears in the above-identified patent and that said Letters Patent is hereby corrected as shown below:

Column 5,
Lines 13 to 16, the formula should appear as follows:

$$Z_2/U = [(m2+m3)p^2 + K3]/[m2 \cdot m3 \cdot p^4 + (K2 \cdot m2 + m2 \cdot K3 + K2 \cdot m3)p^2 + K2 \cdot K3]$$

$$Ft/U = -K3 \cdot m2 \cdot p^2 / [m2 \cdot m3 \cdot p^4 + (K2 \cdot m2 + m2 \cdot K3 + K2 \cdot m3)p^2 + K2 \cdot K3]$$

Lines 21 to 27, should appear as follows:

$$f_0 = \tfrac{1}{4}\pi \left(m2 \cdot K2 + K2 \cdot m3 + K2 \cdot m2 - \sqrt{\Delta}\right)$$

$$f_1 = 1/2\pi \sqrt{K3/(m2+m3)}$$

$$f_2 = \tfrac{1}{4}\pi \left(m2 \cdot K3 + K2 \cdot m3 + K2 \cdot m2 + \sqrt{\Delta}\right)$$

$$\Delta = \begin{pmatrix} m2^2 \cdot K3^2 - 2m2 \cdot m3 \cdot K2 \cdot K3 + 2m2^2 \cdot K3 \cdot K2 + K2^2 \cdot m3^2 + 2K2^2 \cdot m3 \cdot m2 + \\ K2^2 \cdot m2^2 \end{pmatrix}$$
$$/(m2 \cdot m3)$$

Lines 31 to 36, should appear as follows:

$$K3 = 2.2 \ 10^5 \ N/m$$

$$m3 = 4 \ kg$$

$$K2 = 1.518 \ 10^6 \ N/m$$

$$m3 = 13.7 \ kg$$

Signed and Sealed this

Fourth Day of February, 2003

JAMES E. ROGAN
*Director of the United States Patent and Trademark Office*